(12) United States Patent
Waye (10) Patent No.: US 7,616,968 B2
(45) Date of Patent: Nov. 10, 2009

(54) SYSTEM AND METHOD TO FACILITATE OVERCOMING A DEGRADATION IN TRANSMISSION THROUGH A RADIATING TRANSMISSION LINE COMMUNICATION SYSTEM

(75) Inventor: Patrick M. Y. Waye, Stouffville (CA)

(73) Assignee: Mine Radio Systems Inc., Goodwood, Ontario (CA)

( * ) Notice: Subject to any disclaimer, the term of this patent is extended or adjusted under 35 U.S.C. 154(b) by 885 days.

(21) Appl. No.: 10/806,359

(22) Filed: Mar. 23, 2004

(65) Prior Publication Data

US 2005/0215277 A1    Sep. 29, 2005

(51) Int. Cl.
*H04B 7/00* (2006.01)
(52) U.S. Cl. ...................... 455/523; 455/517
(58) Field of Classification Search ............... 455/523
See application file for complete search history.

(56) References Cited

U.S. PATENT DOCUMENTS

| | | | | |
|---|---|---|---|---|
| 3,569,835 A | * | 3/1971 | Harner | 455/71 |
| 3,895,369 A | * | 7/1975 | Ono et al. | 340/538.13 |
| 4,127,816 A | * | 11/1978 | Grosso et al. | 370/216 |
| 4,191,925 A | * | 3/1980 | Dixon et al. | 455/227 |
| 4,476,574 A | | 10/1984 | Struven | |
| 4,604,745 A | * | 8/1986 | Takasaki et al. | 714/713 |
| 4,641,657 A | * | 2/1987 | Ellis | 606/1 |
| 4,695,788 A | * | 9/1987 | Marshall | 324/527 |
| 4,777,652 A | | 10/1988 | Stolarczyk | |
| 4,819,652 A | * | 4/1989 | Micco | 600/455 |
| 4,866,732 A | * | 9/1989 | Carey et al. | 375/141 |
| 5,115,463 A | * | 5/1992 | Moldavsky et al. | 455/465 |
| 5,187,803 A | * | 2/1993 | Sohner et al. | 455/3.03 |
| 5,278,989 A | * | 1/1994 | Burke et al. | 455/8 |
| 5,313,947 A | * | 5/1994 | Micco | 600/455 |

(Continued)

FOREIGN PATENT DOCUMENTS

JP        0625919        9/1994

(Continued)

OTHER PUBLICATIONS

Alcivar Ernesto, "Repeater Amplifier System: Principles and Applications", TX/RX Systems Inc., 1994, 32 pages.*

*Primary Examiner*—Duc Nguyen
*Assistant Examiner*—Hai V Nguyen (57) ABSTRACT

The communication system comprises amplification units coupled to the radiating transmission line at periodic locations for amplifying communication signals radiating and traveling upstream and downstream on the transmission line. During normal operation, mobile communication units near the radiating transmission line can communicate with other mobile communication units near the transmission line as well as with a base station by transmitting communication signals at a first and second frequency. The amplification units also comprise degradation detection units which detect when the communication system has been degraded between any two amplification units. Upon detection of a degradation, the amplification units commence to amplify, transmit and receive the communication signals across the location of the detected degradation at a first fault frequency and a second fault frequency, rather than the first frequency and second frequency, respectively. The first fault frequency and the second fault frequency are selected and the power level of the signals is increased in order to facilitate radiation of the communication signals across the detected degradation in the communication system.

23 Claims, 5 Drawing Sheets

U.S. PATENT DOCUMENTS

| | | | | |
|---|---|---|---|---|
| 5,432,838 | A * | 7/1995 | Purchase et al. | 455/523 |
| 5,669,065 | A * | 9/1997 | Waye et al. | 455/523 |
| 5,678,177 | A * | 10/1997 | Beasley | 455/16 |
| 5,697,067 | A * | 12/1997 | Graham et al. | 455/523 |
| 5,809,429 | A * | 9/1998 | Knop et al. | 455/523 |
| 6,006,351 | A * | 12/1999 | Peretz et al. | 714/56 |
| 6,195,561 | B1 * | 2/2001 | Rose | 455/523 |
| 6,317,609 | B1 * | 11/2001 | Alperovich et al. | 455/556.1 |
| 6,587,974 | B1 * | 7/2003 | Majd et al. | 714/56 |
| 6,937,820 | B2 * | 8/2005 | Iwaki et al. | 398/6 |
| 7,024,157 | B2 * | 4/2006 | Waye et al. | 455/3.05 |
| 7,034,545 | B2 * | 4/2006 | Brown et al. | 324/538 |
| 7,039,325 | B2 * | 5/2006 | Sekiya et al. | 398/181 |
| 7,043,271 | B1 * | 5/2006 | Seto et al. | 455/562.1 |
| 7,061,251 | B2 * | 6/2006 | Taylor et al. | 324/534 |
| 7,068,704 | B1 * | 6/2006 | Orr | 375/139 |
| 7,072,427 | B2 * | 7/2006 | Rawlins et al. | 375/346 |
| 7,171,322 | B2 * | 1/2007 | Taylor | 702/106 |
| 7,174,108 | B2 * | 2/2007 | Kamura | 398/181 |
| 7,184,659 | B2 * | 2/2007 | Hamoir | 398/5 |
| 7,254,511 | B2 * | 8/2007 | Niedzwiecki et al. | 702/118 |
| 7,257,323 | B2 * | 8/2007 | Noguchi et al. | 398/24 |
| 7,272,417 | B2 * | 9/2007 | Mostafa et al. | 455/562.1 |
| 7,298,396 | B2 * | 11/2007 | Brown et al. | 348/181 |
| 2002/0022451 | A1 * | 2/2002 | Waye et al. | 455/3.05 |
| 2004/0032642 | A1 * | 2/2004 | Imai et al. | 359/334 |
| 2005/0147191 | A1 * | 7/2005 | Geier et al. | 375/344 |
| 2005/0203711 | A1 * | 9/2005 | Taylor et al. | 702/59 |
| 2005/0228604 | A1 * | 10/2005 | Niedzwiecki et al. | 702/106 |
| 2005/0234661 | A1 * | 10/2005 | Taylor | 702/57 |
| 2005/0234662 | A1 * | 10/2005 | Niedzwiecki et al. | 702/60 |
| 2005/0234666 | A1 * | 10/2005 | Taylor et al. | 702/66 |
| 2005/0256651 | A1 * | 11/2005 | Taylor | 702/19 |
| 2006/0082494 | A1 * | 4/2006 | Deininger et al. | 342/165 |

FOREIGN PATENT DOCUMENTS

JP   2002190755 A2   5/2002

* cited by examiner

SYSTEM AND METHOD TO FACILITATE OVERCOMING A DEGRADATION IN TRANSMISSION THROUGH A RADIATING TRANSMISSION LINE COMMUNICATION SYSTEM

FIELD OF THE INVENTION

This invention relates to radio frequency communication systems, and, in particular radio frequency communication systems utilizing radiating or "leaky" transmission lines. In a particular embodiment, the present invention relates to a radio frequency communication system which can transmit communication signals across radiating transmission lines experiencing a degradation in the transmission line, such as may occur, for example, as a result of damage to the radiating transmission line or damage to one or more components coupled to the radiating transmission line such as amplification units or branching units.

BACKGROUND OF THE INVENTION

Radiating transmission lines are deliberately constructed as imperfect transmission lines so that signals in the inner conductor radiate electromagnetic fields outwardly from the line as the electrical signals are being transmitted down the line. The electrical magnetic fields radiated from the line can be picked up by mobile receivers located remotely, but in the vicinity, of the transmission line. Furthermore, components can be connected directly to the radiating transmission line to either modify the signal, such as amplifying it, branch the signal to more than one line, or receive and send communication signals such as through radio phones and other electrical components. Radiating transmission line communication systems may also transmit data and/or video signals as disclosed, for instance, in U.S. Pat. No. 5,697,067 to Graham et al. assigned to the same assignee as the present application and incorporated herein by reference.

Radiating transmission lines can take on several different forms. One form comprises an open braid coaxial cable. Other forms comprise coaxial cables having cylindrical outer sheaths with longitudinal slits to permit radiation.

Radiating transmission lines are commonly used in environments where electromagnetic waves, such as radio frequency waves, do not propagate well. This type of environment exists, for example, in underground mine shafts. For example, a worker in a mine shaft using a remote mobile communication unit, such as a mobile radio or walkie-talkie, cannot communicate to other workers who also have remote mobile communication units because the radio waves cannot propagate long distances down a mine shaft. However, if all of the workers are near a radiating transmission line, such that the radio waves from the first worker's remote mobile communication unit could be received by the transmission line, those signals could be transmitted by the radiating transmission line, modified and then radiated near the remote mobile communication units of other workers. In this way, communication in a mine shaft or other environment where radio frequency waves do not propagate well, can be effected.

In the past, several different types of communication systems utilizing radiating transmission lines have been used. However, a common difficulty with most of the prior art communication systems has been that a degradation in the system, such as a fault in the radiating transmission line or a component in the system, effectively prevents communication to the portion of the mine downstream from the fault. For example, if a degradation in transmission arose at a point in the communication system such that a communication signal could not travel on the transmission line, either into or out of the mine, then persons located downstream of the degradation and going deeper into the mine could not communicate with others.

Such a degradation in the communication could arise from a fault in the radiating transmission line itself, for example, if the radiating transmission line was cut, developed a short circuit or was damaged such as by way of water, fire or an explosion. A fault could also arise in the electronic circuitry of one of the electronic units, such as an amplification unit or a branch unit. A malfunction in one of the mobile radios would not necessarily be considered a fault in the system, because only the mobile radio affected would cease to operate and the other elements of the system would continue operating as before, and therefore such a fault would not typically result in degradation of transmission of communication signals in the communication system.

A radio frequency communication system for overcoming faults is also disclosed in U.S. Pat. No. 5,669,065 to Patrick M. Y. Waye and Kenneth John Morrell, which has been assigned to the same assignee as the present application and is incorporated herein by reference. U.S. Pat. No. 5,669,065 discloses a system for overcoming a fault in a communication system where the radiating transmission line loops around the underground environment either directly or through branching units, such that both the first end and the second end of the transmission line may meet at the base station. When a fault occurs in the system disclosed in U.S. Pat. No. 5,669,065, the base station commences transmitting and receiving signals from both ends of the transmission line and the amplification units are reconfigured to communicate signals away from the fault and towards the base station. While U.S. Pat. No. 5,669,065 is very effective in mines having two connecting bores, such that the transmission line can loop around the two connecting bores and both ends of the transmission line may meet at the base station, the communication system disclosed in U.S. Pat. No. 5,669,065 would not operate well in cases where the mine has a single bore, or has a second bore that intersect the first bore, or if there are multiple faults isolating sections of the radiating transmission line. In such a case, faults occurring in the communication system could render communication inoperable to locations between the fault and termination units located downstream from the fault.

U.S. Pat. No. 5,278,989 to Burke discloses a communication system for serving a plurality of radio units in a frequency blocked area, and, comprising radiating transmission lines and amplification units associated with the cables. In the event of a fault in one of the application units being detected, control data is passed along the network of radiating cables for changing the path of communication through the communication system. This system provides for a central control station to communicate with each amplifier unit to assist in detecting faults in the amplifiers, but does not disclose a means for detecting faults or degradations along the transmission lines. Upon detection of a fault in the amplification unit, the system disclosed in U.S. Pat. No. 5,278,989 sends a signal to the amplification unit experiencing the fault, to reconfigure the amplifier which is experiencing the fault, such that energy received over the coaxial cable is amplified by a secondary or backup amplifier in the amplification unit rather than the primary amplifier. However, the system disclosed in U.S. Pat. No. 5,278,989 would not overcome a degradation in the communication system which occurred, for example, by damage to the transmission line as opposed to a fault in the amplifier. Rather, U.S. Pat. No. 5,278,989 merely discloses use of a secondary or backup amplifier which is activated upon detecting a fault in the primary amplifier.

SUMMARY OF THE INVENTION

Accordingly, it is an object of this invention to at least partially overcome the disadvantages of the prior art. Also, it is an object of this invention to provide an improved type of communication system and amplification unit which can overcome a degradation in the communication system as may result from damage to the radiating transmission and/or one or more components coupled to the validating transmission line.

Accordingly, in one of its aspects, this invention resides in a radio frequency communication system for communicating signals, said system comprising: a radiating transmission line having a first end and a second end; a base station coupled to the first end, said base station comprising a base receiver for receiving a first communication signal at a first frequency from the first end; at least two amplification units coupled to said transmission line at periodic locations for amplifying the first communication signal at the first frequency from previous amplification units in an upstream direction towards the first end, and said at least two amplification units having degradation detection units for detecting a degradation in the communication system between the at least two amplification units; and wherein upon detection of a degradation in the communication system between any two amplification units, the amplification units detecting the degradation change the frequency of the first communication signal along the radiating transmission line between the two amplification units having detected the degradation from the first frequency to a predetermined first fault frequency to facilitate overcoming the degradation in the communication system.

In a further aspect, the present invention resides in a radio frequency communication system for communicating communication signals on a radiating transmission line, said radiating transmission line having a first end and a second end located remotely from the first end, said first end coupled to a base station comprising a base receiver for receiving a first communication signal at a first frequency from the first end, an amplification unit for facilitating communication of the communication signals, said amplification unit comprising: a downstream connection for connecting a length of the transmission line in a downstream direction towards the second end of the transmission line; an upstream connection for connecting a length of the transmission line in an upstream direction towards the first end; an amplifier for amplifying the first communication signal in a direction towards the first end; a degradation detection unit for detecting a degradation in the communication signal in the length of the transmission line at the upstream connection; wherein upon detection of a degradation in the length of the transmission line in the upstream connection, the amplification unit commences to amplify and transmit the first communication signal at a predetermined first fault frequency and upon no detection of a degradation in the length of the transmission line at the downstream connection, the amplification unit continues to receive the first communication signal at the downstream connection at the first frequency.

In a still further aspect, the present invention relates to a method for communicating communication signals utilizing a radiating transmission line having at least two amplification units coupled to the transmission line at periodic locations for amplifying communication signals along the radiating transmission line, said method comprising: detecting a degradation in the communication signal along a link of the radiation transmission line between any two amplification units coupled to the radiating transmission line; and at each of the two amplification units detecting a degradation in the communication system, altering a frequency of the communication signal along the length of the transmission line between the two amplification units having detected the degradation from a first frequency, used when no degradation is detected, to a predetermined first fault frequency different from the first frequency.

In one aspect, the present invention facilitates overcoming a degradation in the communication system by detecting when a degradation occurs and altering the frequency of the communication signal travelling between two amplification units across the location of the degradation. Preferably, the communication signal is altered to a first fault frequency which is predetermined so that amplification units on either side of the degradation will know the precise first fault frequency at which the first communication signal will be received and transmitted. The predetermined first fault frequency is preferably selected to facilitate radiation of a first communication signal from a portion of the radiating transmission line located downstream of the degradation to a second portion of the radiating transmission line located upstream of the degradation. In this way, the properties of the radiating transmission line, namely that it permits radiation of the signals, could be used to overcome a degradation in a communication system. To facilitate overcoming the degradation, the first fault frequency is preferably lower than the first frequency as lower frequency signals tend to radiate across the radiating transmission line better than higher frequencies. Furthermore, it is preferred that the first fault frequency is a frequency that is not used by any other components in the communication system in order to facilitate the filtering of the first fault frequency thereby further increasing the quality of the signal and further facilitating overcoming a degradation in the communication system.

As with the first communication signal travelling upstream from the mine towards the base station, the communication system may also transmit a second communication signal downstream into the mine at a second frequency. In the event of detecting a degradation in the communication system, the frequency of the second communication signal is changed from the second frequency to a predetermined second fault frequency to facilitate overcoming the degradation in the communication system in a downstream direction. In order to maintain transmission and radiation of the first communication signal and second communication signal through portions of the communication system which are not affected by the degradation, the amplification unit retransmits the first and second signals at the first and second frequencies in lengths of the transmission line wherein no degradation is detected.

In one embodiment, the amplification units comprise degradation detection units to detect a degradation of the communication system. In one embodiment, the degradation detection units simply identify if the first communication signal and/or the second communication signal have a decreased power level for a predetermined period of time such as one second to ten seconds and conclude a degradation must have occurred in such a situation. In another embodiment, each of the amplification units send a DC current in an upstream or downstream direction and if the DC current is interrupted or has a lower power level for a predetermined period of time, the degradation detection units determine that a degradation in the corresponding length of the communication system must have occurred. Upon detection of a degradation, the amplification units change the frequency of the first and second communication signals from the first and second frequency to the first fault frequency and the second fault frequency, respectively, in the length of the transmission line which experiences the degradation in order to attempt to overcome the degradation.

It is understood that a degradation in the communication signal could result from any manner of events which affect transmission of the communication signals along the transmission line. For instance, a degradation of the communication signal could occur from the radiating transmission line being damaged by fire, explosion or water, or, otherwise being short circuited. A degradation in the communication system could also result if a component attached to the transmission line, such as an amplification unit, branching unit or portable telephone, is damaged or short circuited, thereby degrading the transmission of the communication signals across the transmission line.

The present invention also relates to the method of attempting to overcome a degradation to the communication system by altering the frequency of the communication signal between amplification units which have detected a degradation in the communication system.

Further aspects of the invention will become apparent upon reading the following detailed description and drawings, which illustrate the invention and preferred embodiments of the invention.

DETAILED DESCRIPTION OF THE PREFERRED EMBODIMENTS

Preferred embodiments of the present invention and its advantages can be understood by referring to the present drawings. In the present drawings, like numerals are used for like and corresponding parts of the accompanying drawings.

Figure 1:
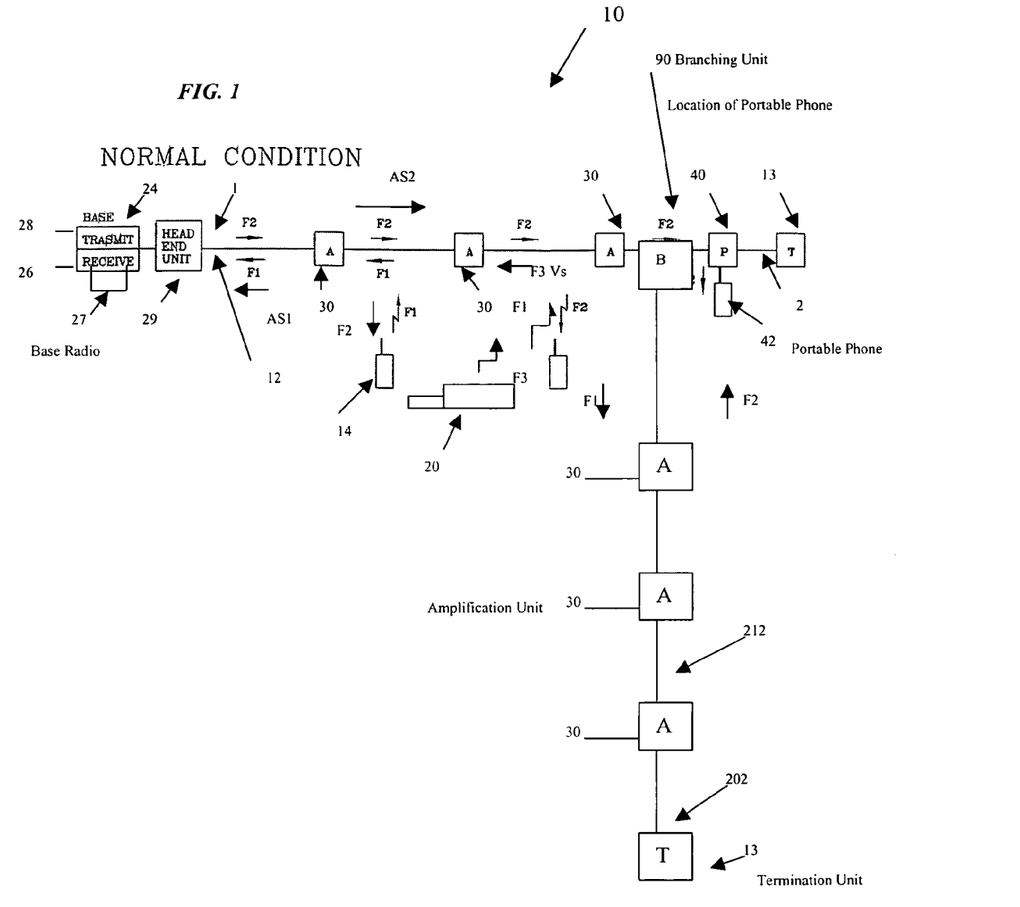
FIG. 1 is a symbolic representation of a conventional radiating transmission line communication system.

FIG. 1 illustrates a radio frequency communication system, shown generally as 10. The communication system 10 comprises a radiating transmission line 12 used for communicating audio signals As from remote mobile audio stations 14. It is understood that several such remote mobile audio stations 14 can be located near the radiating transmission line 12. The system 10 could optionally be used to communicate data signals and/or video signals Vs from remote video stations 20. The system 40 could also be used to communicate emergency evacuate signals or any other type of communication signals.

For ease of illustration, the radio frequency communication system 10 shall be considered as being installed in an underground mine such that a substantial part of the radiating transmission line 12 is located below ground. However, it is understood that the system 10 could be used in any environment where radio waves do not propagate well.

The radiating transmission line 12 is of the type as discussed above wherein electromagnetic signals are both transmitted and radiated from the transmission line 12. In this way, remote mobile stations, such as remote mobile audio stations 14 and remote video stations 20, can transmit and/or receive radio frequency electromagnetic transmissions to and/or from the radiating transmission line 12.

In one embodiment, each mobile audio station 14 has a transmitter for transmitting a first audio signal As1 at a first frequency F1 and a receiver for receiving a second audio signal As2 from the transmission line 12 at a second frequency F2. Accordingly, the audio signals As may comprise the first audio signals As1 which travel from the mine to the base station 24 generally located on the surface and the second audio signals As2 which travel from the surface into the mine. The audio signals As convey audio information but, in one embodiment, can also convey narrow band computer data. It is apparent that the first frequency F1 should generally be different from the second frequency F2. Also, the first frequency F1 and second frequency may have a number of channels and/or transmit the communication signals in different ways, such as using multiplexing and/or encoding.

The system 10 may also comprise other remote components such as a remote mobile video station 20 having a mobile transmitter for transmitting video signals Vs to the transmission line 12 at a third frequency F3. The remote mobile video station 20 can be any type of portable video camera 20 having a built in transmitter for transmitting the video signals at a frequency. The video signals Vs convey video information such as images sensed by the remote mobile video station 20. In addition to mobile audio and video stations 14, 20, the system 10 may also comprise fixed audio and/or video stations shown generally by reference numeral 42 in FIG. 1 coupled to the transmission line 12 at the connection 40.

A first end 1 of the transmission line 12 is coupled to a base station 24. It does not matter which end of the transmission line 12 is coupled to the base station 24 as long as all of the amplification units 30 are oriented to amplify the first and second audio signals As1, As2 and the video signals Vs in the appropriate direction. In the embodiment where the communication system 10 is used in a mine, such that a substantial part of the line 12 is located below ground, it is preferable that the base station 24 is located above ground.

As shown in FIG. 1, the transmission line 12 is preferably coupled to the base station 24 by electrically connecting the first end 1 of the line 12 to a part of the station 24. As shown in FIG. 1, this is preferably done by connecting the line 12 to a header unit 29 which can receive the transmission line 12 and separate the first and second audio As1, As2 and the video signals Vs.

The base station 24 further comprises a base receiver 26 and a base transmitter 28. It is understood that the base receiver and transmitter 26, 28 can be directly coupled to the line 12 or can be indirectly coupled to the line 12 by means of the header unit 29 as shown in FIG. 1.

The base receiver 26 receives signals from the first end 1 of the transmission line 12 at the first frequencies F1. The base transmitter 28 can transmit signals to the transmission line at the second frequency F2. In this way, the first audio signal As1 can be received by the base receiver 26 and re-transmitted by the base transmitter 28 at the second frequency F2. This allows the first audio signals As1, which are transmitted by remote audio stations 14 upstream to the base receiver 26, to be re-transmitted by the base transmitter 28 at the second frequency F2 downstream into the line and received by the receivers (not shown) in other remote mobile audio stations 14 set at the second frequency F2. In this way, one mobile audio station 14 can communicate to all other mobile audio stations 14 which can receive the second audio signal As2 at the second frequency F2. Reference to upstream or upstream direction will generally refer to signals moving towards the base station 24 of the system 10, and, reference to downstream will generally refer to signals moving away from the base station 24.

Furthermore, the base receiver 26 may also receive other signals, such as the video signal Vs at other frequencies, such as the third frequency F3. This video signal Vs can be reproduced on a video monitor or can be re-transmitted above the surface to other locations.

In a further embodiment, the system 10 comprises a base radio 27 located near the base station 24. The base radio 27 can receive or transmit audio signals to the base station 24 which are then received and re-transmitted down the line 12 by the transmitter 28. The base radio 27 generally comprises a microphone into which persons on the surface can speak into. The audio signals transmitted by the base radio 27 are then modulated and transmitted at the second frequency F2 down the line 12 by the base transmitter 28. In this way, persons located on the surface of the mine can communicate with persons located underground. In a further embodiment, the base radio 27 can receive audio signals from other radios located on the surface, or be connected to telephone lines located on the surface, such that persons distant from the base station 24 can communicate with persons in the mine.

Standard radiating transmission lines 12 can usually radiate and transmit electromagnetic signals in a frequency range of 20 MHz to 500 MHz. However, in a preferred embodiment of the present invention, the first and second frequencies F1, F2 are above 100 MHz and preferably between 100 and 200 MHz. Furthermore, if other signals, such as video signals Vs at the third frequency F3 are used, it is preferable that the third frequency F3 is below 100 MHz. This separation of the frequencies allows for easier separation and amplification of the first and second audio signals As1, As2 and the video signals Vs.

In a further preferred embodiment, the second frequency F2 is about 155 MHz and the first frequency F1 is about 170 MHz. In this way, both the first and second audio signals As1, As2 are in the VHS band. In this preferred embodiment, it is also preferable that the third frequency F3 be between about 55 MHZ and 68 MHz. It has been found that these frequencies interface well with standard walkie-talkies and transmitting portable video cameras. These frequencies also facilitate 2 or more channels for the first and second audio signals As1, As2.

The system 10 in a further embodiment comprises branching units 90 which permit a branching transmission line 212 to be "branched-off" from the transmission line 12 so that the transmission line 12 extends in two different directions. For example, in the case of a mine, the branching units 90 allow the transmission line 12 to extend down a shaft and the branching transmission line 212 to extend horizontally along different levels.

The transmission line 12 will generally terminate at a second end 2 located remotely from the first end 1. The second end 2 will generally be located underground in the case where the system 10 is installed in a mine. The system 10 preferably comprises termination units 13 located at the second end 2 of the radiating transmission line 12. The termination units 13 comprise impedance-matching modules in order to terminate the transmission line 12 with a minimum amount of reflected signal. In embodiments where the system 10 comprises a branching unit 90, the system 10 will preferably comprise a termination unit 13 at the end 202 of the branching transmission 212.

The communication system 10 also comprises at least two amplification units 30. As seen in FIG. 1, the amplification units 30 are coupled to the transmission line 12 at periodic locations. The amplification units 30 are used to amplify the audio and video signals As and, if present, video signals Vs as well as any other type of communication signals which the communication system 10 may be using. Generally, one amplification unit 30 is placed along the line 12 at every 350 m. However, amplification units 30 may be required more frequently if other elements, such as branching units 90 interrupt the line 12 thereby increasing the signal loss. The branching units 90 may also optionally contain amplification units 30 for amplifying the audio signals As in the transmission line 12 and the branching transmission line 212.

Figure 2:
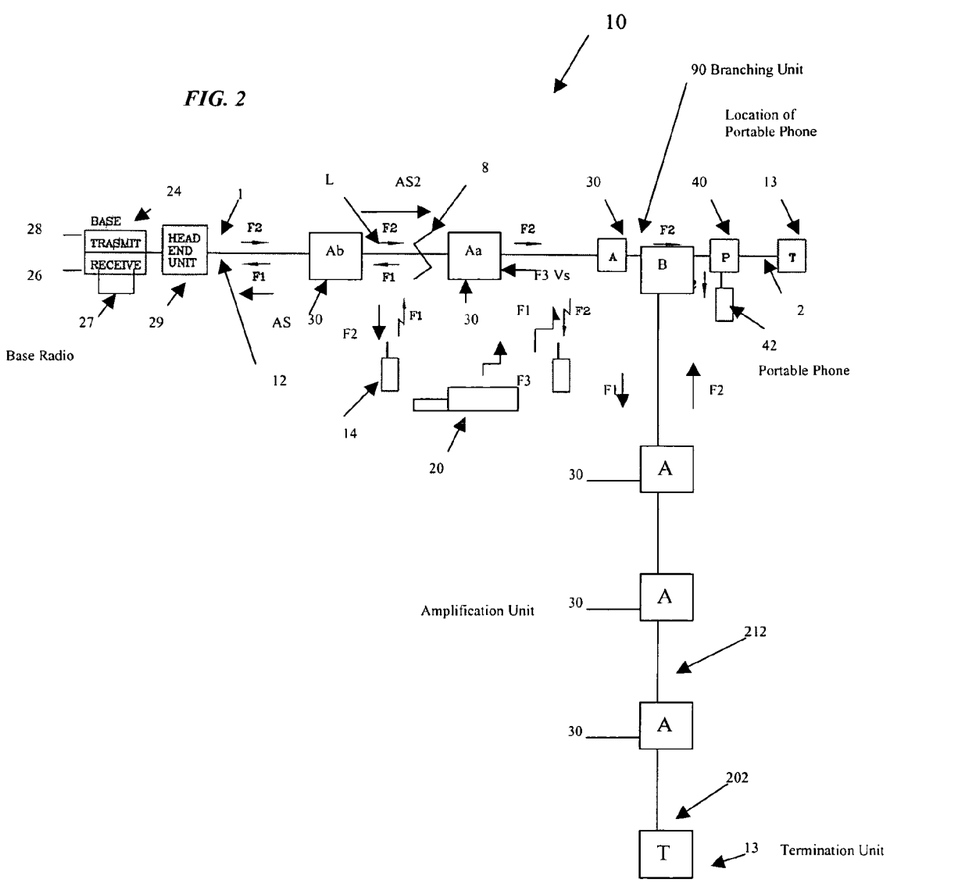
FIG. 2 is a symbolic representation of the communication system shown in FIG. 1 experiencing a degradation.

FIG. 2 illustrates the communication system 10 with a degradation, as shown generally by reference numeral 8, located along a length L of the transmission line 12. This would be particularly important if the degradation 8 resulted from damage to the transmission line such as by way of fire, water and/or an explosion. Failure to be able to communicate downstream from the degradation 8 would prevent communication with personnel and/or equipment located further downstream from the degradation 8 and therefore further downstream from an explosion or fire which may have occurred. Clearly, failure to communicate downstream of the degradation 8 could severely hamper the ability to reach any persons located downstream from the degradation 8 especially if the communication system 10 was used in an underground environment such as a mine. The degradation 8 may result from damage to the communication system which prevents or severely degrades transmission of the communication signals, such as the audio signals As1, As2 and/or the video signals Vs between the two amplification units 30, labelled for convenience in FIG. 2 as amplification units Ab and Aa. In such a situation, transmission of the communication signals As and Vs would be prevented downsteam from the degradation 8. In other words, while communication signals As, Vs could travel from the base 24 to the amplification unit labelled Ab 30, no communication signals As, Vs would be able to travel past the fault 8. This was essentially prevent communication of signals to and from the portion of the radiating transmission line 12. Furthermore, as the branching radiating transmission line 212 is located downstream of the fault, communication to and from the branching radiating transmission line 212 to the base 24 would also be precluded.

Figure 3:
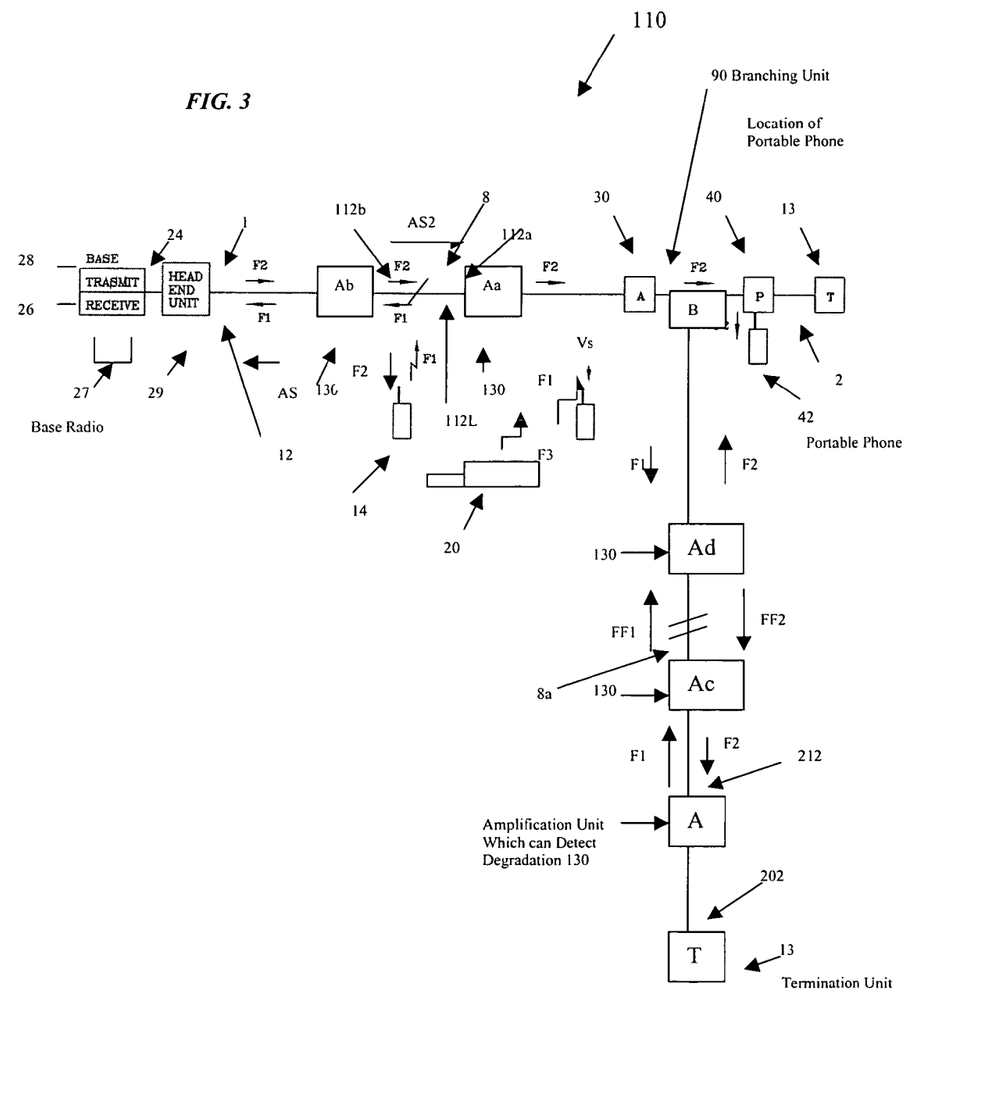
FIG. 3 is a symbolic representation of a communication system according to one embodiment of the present invention experiencing a degradation.

FIG. 3 illustrates an embodiment of the present invention, identified generally by reference numeral 110. The system 110 shown in FIG. 3 has similar functionality to the system 10 shown in FIGS. 1 and 2, except that the amplifiers 130 in the system 110 shown in FIG. 3 differs from the amplification units 30 shown in FIGS. 1 and 2 in a manner discussed more fully below.

FIG. 3, illustrates a degradation 8 having occurred along the length 112L of the radiating transmission line 12 between amplification units Ab and Aa, similar to the degradation 8 illustrated in FIG. 2. However, unlike the system 10 illustrated in FIG. 2, the system 110 illustrated in FIG. 3, according to one embodiment of the present invention, has amplification units 130 which can detect a degradation 8 in the communication system between the amplification units 130. Upon detection of the degradation 8, the amplification units 130 alter or change the frequency of the communication signals AS from the first and second frequencies F1, F2, which are generally selected to communicate well with mobile units such as mobile audio stations 14, to predetermined first and second fault frequencies FF1, FF2.

For example, as illustrated in FIG. 3, once any two amplification units 130 of the system 110 detect a degradation 8, the amplification units 130 will commence to transmit and receive the communication signals AS1 and AS2 at predetermined first and second fault frequencies FF1, FF2, rather than the first and second frequencies F1 and F2, respectively along the length 112L of the radiating transmission line 12 between the two amplification units Ab, Aa having detected the degradation 8.

The predetermined first and second fault frequencies FF1, FF2 will be predetermined such that the amplification units 130 will know immediately which frequencies to use in the event of a degradation 8 being detected along the length 112 L of the radiating transmission line 12 between the two amplification units 130. The first and second fault frequencies FF1, FF2 may be any frequency. Preferably, the first and second fault frequencies FF1, FF2 are selected to facilitate radiation of the communication signals across the degradation 8. In a further preferred embodiment, the first and second fault frequencies FF1, FF2 are in the radio frequency range. Furthermore, the amplification units 130 may increase the power level or gain of the audio signals AS in order to further facilitate radiating the audio signals AS across the degradation 8 to facilitate overcoming the degradation 8 in the communication system 110.

Generally, lower frequencies can radiate well across the degradation 8 in the radiating transmission line. This is due in part to the radiating transmission line 12 acting essentially as a long and low frequency antenna once the transmission line 12 is separated by a degradation 8 along the length 112 L of the transmission line 12. Therefore, in a preferred embodiment, the predetermined first fault frequency FF1 will preferably be lower than the first frequency F1. Similarly, the predetermined second fault frequency FF2 will be lower than the second frequency F2. Furthermore, in order to facilitate overcoming the degradation 8 in the communication system 110, and assist in filtering out noise which may arise due to the degradation 8, it is preferred that the first fault frequency FF1 and the second fault frequency FF2 are different from any other frequencies used in the communication system 110 at least between the two amplification units Ab, Aa which have detected the degradation. In general, the first fault frequency FF1 and the second fault frequency FF2 are selected to facilitate radiation of the communication signals, such as the first audio signals AS1 and the second audio signals AS2, to and from a first portion 112a of the radiating transmission line 12 located downstream of the degradation 8 to a second portion 112b located upstream of the degradation unit.

While reference has been made, for example, to the first audio signal AS1 and the second audio signal AS2 which are transmitted under normal conditions at the first frequency F1 and the second frequency F2, it is understood that any type of communication signal can be altered or changed to a fault frequency which facilitates radiation of the communication signal across the degradation 8. This would be the case whether the communication signal is an audio signal AS, a video signal VS, data signals (not shown), notification signals, warning signals, or any other type of signal.

FIG. 3 also shows a second fault 8a located across the branching radiating line 212. The amplification unit 130 identified by Ad and Ac, upon detection of the degradation 8a, will alter or change the frequency of the first audio signal AS1 and the second audio signal AS2 from the first frequency F1 and the second frequency F2 to the first predetermined fault frequency FF1 and a second predetermined fault frequency FF2, respectively. As the amplification units Ad, Ac would generally be located remotely from the amplification units Ab, Aa, use of the same predetermined fault frequencies FF1, FF2 between amplification units Ad, Ac, would not necessarily interfere with signals being transmitted at the predetermined fault frequencies FF1, FF2 between amplification units Ab, Aa. Accordingly, while it is preferred that the first fault frequencies FF1, FF2 are different from any other frequencies in the communication system 110 between the two amplification units Ab, Aa and the amplification units Ad, Ac, it is not necessarily required that the first fault frequency FF1, FF2 be different from any other frequency in the communication system 110. It is also understood that in a preferred embodiment, the first fault frequency FF1 is at a different frequency from the second fault frequency FF2.

It is possible that the degradation 8 in the communication system could prevent communication from mobile audio stations 14 simply because the power level of the mobile audio stations 14 is not as great, for instance, as a portable phone 42 connected directly to the transmission line 12 at location 40. Therefore, it would be preferred that communication to the base 24 be conducted through the portable phone 42 as the power level of the audio signals AS would be initially higher with use of the portable phone 42.

In a preferred embodiment, the branching unit 90 would also comprise amplification units (not shown) to facilitate amplification of the communication signals As, Vs before and after connection of the branching radiating transmission line 212 to the radiating transmission line 12. In this embodiment, the amplification units (not shown) located in the branch unit 90 will operate in a similar manner along both the transmission line 12 and the branching transmission line 212 as discussed above with respect to amplification units 130. In particular, the amplification units (not shown) and the branch unit 90 will commence to communicate the communication signals As, Vs at fault frequencies FF1, FF2 or other fault frequencies which are selected to facilitate overcoming the degradation 8 in the communication system 10.

Figure 4:
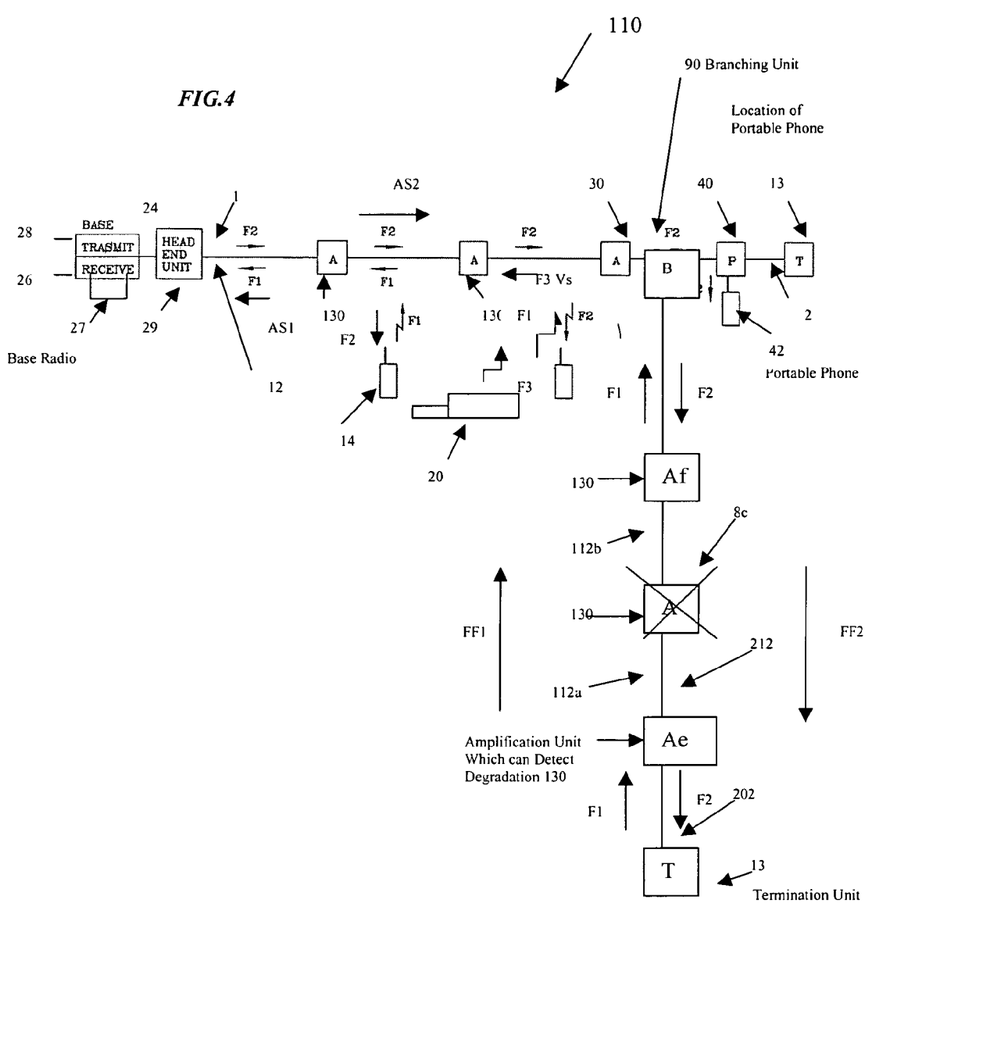
FIG. 4 is a symbolic representation of a communication system according to one embodiment of the present invention experiencing another degradation.

FIG. 4 shows an embodiment of the communication system, shown generally by reference numeral 110 with a degradation, as shown generally 8c, arising from a fault in an amplification unit 130. Such a degradation 8c in the communication system 110 arising, for instance, from a short circuit in the amplification unit 130 or as a result of fire and/or an explosion which causes a fault in the amplification unit 130 shown by the "x". To overcome the degradation 8c resulting from a fault in the amplification unit 130, amplification units 130 labelled as Af, Ae will preferably alter or change the frequency of the first audio signal AS1 from the first frequency F1 to the predetermined first fault frequency FF1 upon detecting the degradation 8c in the communication system 130. Similarly, with respect to the second audio signal AS2, the amplification units 130 identified by labels Ae and Af, will alter the frequency of the second audio signal AS2 from the second frequency F2 to the predetermined second fault frequency FF2. The first portion 112a of the length of the radiating transmission line, in this case the branching radiating transmission line 212, between the amplification units Af and Ae will then commence to radiate the audio signal AS1 at the first fault frequency FF1 to be received by the second portion 112b of the branching radiating transmission line 212 upstream of the degradation 8c, in this case the faulty amplification unit 130. Similarly, the amplification unit 130 labelled as Af will transmit the second audio signal AS2 at the predetermined second fault frequency FF2 such that it radiates across the second portion 112b of the branching radiating transmission line 212 to be received by the first portion 112a downstream of the degradation 8*c* and eventually received by the amplification unit 130 identified by label Ae. In this way, altering the frequency of the communication signals, such as the audio signals AS1, AS2, from the first and second frequencies F1, F2 used during normal operation of the communication system 110 to the predetermined first and second fault frequencies FF1, FF2 which preferably are selected to facilitate radiation of the communication signals AS across the degradation 8*c* will facilitate overcoming the degradation 8*c* in the communication system 110.

For greater clarity, it is understood that reference to changing or altering the frequency of a communication signal, such as the first audio signals AS1, from the first frequency F1 to the predetermined first fault frequency FF1, involves the amplification units 130 between which the degradation 8, 8*a* or 8*c* has been detected, commencing to transmit, receive and amplify the first communication signal AS1 at the predetermined first fault frequency FF1. Accordingly, altering or changing the frequency of the first communication signal AS1 from the first frequency F1 to the first fault frequency FF1 refers to altering the frequency at which the first communication signal AS1 is transmitted along the length 112 L of the radiating transmission line 12 or the branching radiating transmission line 212 along which a degradation 8, 8*a* or 8*c* has been detected. Similarly, changing or altering the frequency of the second communication signal AS2 from the second frequency F2 to the predetermined second fault frequency FF2, also involves the amplification units 130 between which the degradation 8, 8*a* or 8*c* has been detected, amplifying, transmitting and receiving the second communication signal AS2 at the second fault frequency FF2, rather than the first frequency F1.

The amplification units 130 may detect a degradation in the communication system 110 between any two amplification units 130 in a number of ways. For instance, in one preferred embodiment, the amplification units 130 will transmit a constant DC signal which, if interrupted, will indicate to the amplification units 130 which experienced the loss in the DC signal that a degradation in the communication system 110 has occurred along the length L of the radiating transmission line 12 between the amplification units 130 where the loss in DC current has been detected. Furthermore, in another embodiment, the amplification units 130 may detect a degradation 8 in the communication system 110 by detecting a decreased power level in the first communication signal AS1 and/or the second communication signal AS2 for a predetermined time period. The predetermined time period may be any reasonable time period during which it would not be expected to have the first and/or second communication signals AS1, AS2 at a decreased power level. In a still further preferred embodiment, the amplification units 130 may detect transmission of any communication signal at one of the predetermined first fault frequencies FF1 or a second fault frequency FF2. This would be the case, preferably, if the first and second fault frequencies FF1, FF2 are not used for any other purpose in the communication system 110. Upon detection of transmission along the length 112 L of the transmission line 12 of a communication signal on either the first fault frequency FF1 or the second fault frequency FF2, the amplification unit 130 may treat this as a detection of a degradation 8 along the length 112 L and commence to transmit and receive all communication signals along the length 112 L at the first fault frequency FF1 and the second fault frequency FF2, and any other fault frequencies which may be used along the length 112 L for other communication signals.

Figure 5:
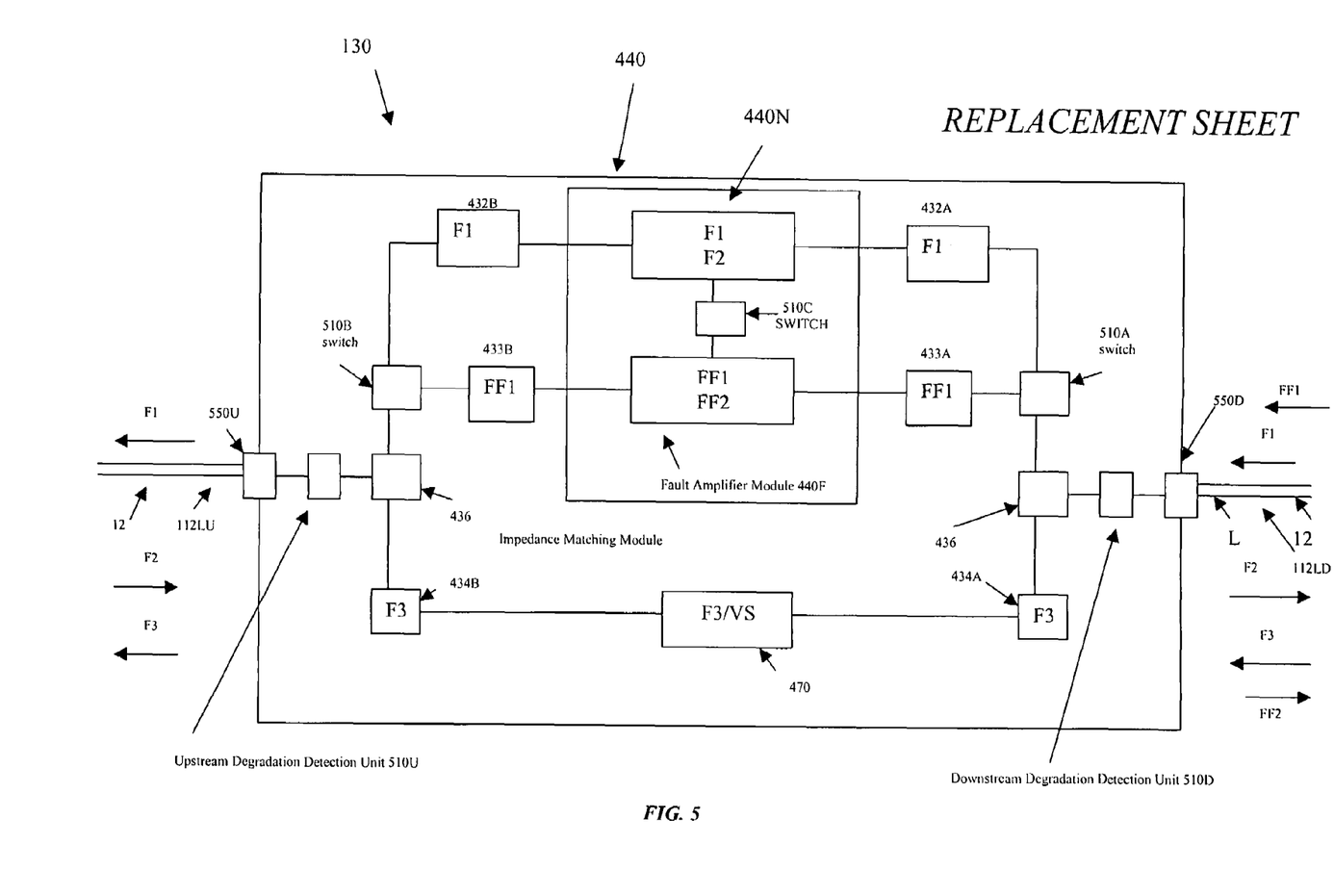
FIG. 5 is a block diagram showing the components of the amplification unit according to one embodiment of the present invention.

FIG. 5 illustrates the internal operation of an amplification unit 130 according to a preferred embodiment of the present invention. As illustrated in FIG. 5, the amplification unit 130 has an upstream connection 550U for connecting a length 112 L of the transmission line 12 in an upstream direction towards the base unit 24 connected to the first end 1 of the transmission line 12. Similarly, the amplification unit 130 has a downstream connection 550D for connecting a length 112LD of the transmission line 12 in a downstream direction towards the second end 2 of the transmission line 12. Generally, the second end 2 of the transmission line 12 will be located remotely from the first end 1 of the transmission line 12. In the embodiment where the communication system 110 is installed in a mine, the second end 2 of the transmission line 12 will likely be located deeper into the mine and the first end 1 of the transmission line 12 will be connected to the base station 24 usually at the surface of the mine.

The amplification unit 130 also preferably comprises degradation detection units 510 for detecting a degradation 8 in the communication system 110 between at least two amplification units 130, as discussed in more detail above. The degradation detection units 510 may comprise an upstream degradation detection unit 510U and a downstream degradation unit 510D. The degradation detection unit 550 will operate to detect a degradation in the communication system 110 in any number of ways, including the ways outlined above. For instance, the degradation detection unit 510 may detect a decrease in the power level of the first audio signal AS1 at frequency F1 or the second audio signal AS2 at the frequency F2 for a predetermined period of time along either lengths 112LU, 112LD of the transmission line. In the alternative, or in addition to, the degradation detection unit 510 may detect the transmission of any communication signal at the first fault signal FF1 and/or the second fault signal FF2. Furthermore, the degradation detection units 510 may be configured to emit and detect a DC current which, if not present on a particular length 112L of the transmission line 12 would indicate that degradation has occurred on that particular length 112L of the transmission line 12. For instance, in the case where a DC current is transmitted on the length 112LU, 112LD of the transmission line 12, it would be preferable if either the downstream or upstream degradation unit 510D, 510U, emit the DC current which is then received by the adjacent amplification unit 130 and returned to close the DC circuit. Upon a decrease in the power level of this DC circuit, it would be apparent to the two amplification units 130 connected to the particular length 112L of a transmission line 12 if a degradation in the communication system 12 had occurred between the amplification units 130. This would be the case, in addition, if the degradation 8 resulted from the fault in an amplification unit 130, such as degradation 8*c* shown in FIG. 4, in which even amplification units 130 separated by the faulty amplification unit 130 would assume that a degradation 8, 8*a* or 8*c* had occurred between them. In other words, the communication system 110 is not limited to detecting faults between only adjacent amplification units 130, but would also extend to detecting any type of degradation 8, 8*a*, 8*c* separating more than one amplification unit 130.

Upon detection of a degradation in a corresponding length 112L of the transmission line 12, the degradation unit 510 will change the frequency of the communication signals AS1, AS2 from the first frequency F1 and the second frequency F2 to the first predetermined fault frequency FF1 and the second predetermined fault frequency FF2, respectively. For example, with reference to FIG. 5, if the downstream degradation detection unit 510D detected a degradation in the length 112LD of the transmission line 12 connected to the downstream connection, the downstream degradation unit 510D would send a signal to the first switch 510A. Similarly, if the upstream degradation unit 510U detected a degradation in the length 112LU of the transmission line 12 connected to the upstream connection 550U, the upstream degradation detection unit 510U would send a signal to the second switch 510B.

As is apparent from FIG. 5, the amplification unit 130 comprises components which are used to amplify the first audio signal AS1 at frequency F1 in an upstream direction and amplify the second audio signals AS2 at frequency F2 in a downstream direction. These components include the impedance matching module 436 connected to the upstream length 112LU and downstream length 112LD of the transmission line 12 which actively match the impedance of the transmission line 12 thereby improving transmission of all the communication signals. The audio signals As are then passed through the switch 510A from the downstream direction and the switch 510B from the upstream direction and, depending on whether degradation has been detected, will go to the high band pass filters 432A, 432B configured to pass signals at the first frequency F1 and the second frequency F2 or the fault high band pass filters 433A, 433B configure to pass communication signals at the fist fault frequency FF1 and the second fault frequency FF2. It is understood that while the filters 432A, 432B and 433A, 433B are illustrated as being combined in a single module, any type of configuration of these filters 432A, 432B, 433A, 433B could be possible.

The amplification unit 130 in a preferred embodiment comprises an amplifier module 440 which can be configured in two parts, namely a non-fault amplifier module 440N for amplifying the communication signal having a frequency F1, F2 when no degradation has been detected, and, a fault amplifier module 440F designed to amplify communication signals at the first fault frequency FF1 and/or second fault frequency FF2 when a degradation has been detected. Switch 510C separating the non-fault amplifier module 440N and the fault amplifier module 440F is optionally present and may be controllable by the degradation detection units 510U, 510D.

In addition to the communication signals which may be transmitted on the first and second fault frequencies FF1, FF2, the amplification unit 130 may also be designed to amplify other communication signals which are communicated on the communication system 110. For instance, the amplification unit 130 may comprise low band pass filters 434A and 434B for passing communication signals, such as the video signal VS, at the frequency F2 in any direction, such as the upstream direction as illustrated in FIG. 5. While the video signals VS may also be configured to have a fault frequency, this is optional and not all communication signals on the communication system 110 may need or be desired to have fault frequencies which can facilitate overcoming a degradation 8 in the communication system 130.

During operation, if the downstream degradation detection unit 510D detects a degradation, it sends a signal to the switch 510A as discussed above which causes the switch 510A to pass at least the first audio signal AS1 to the fault high band pass filter 433A which passes the first communication signal at the first fault frequency FF1 to the fault amplifier module 440F. The first audio signal then optionally is amplified by the fault amplifier module 440F or transferred for amplification by the non-fault amplifier 440N which amplifies the signal at frequency F1 and passes the first audio signal AS1 through the non-fault high band pass filter 432B through switch 510B for transmission through the upstream connection 550U on the upstream length 112LU of the transmission line 12. It is apparent that in this configuration, even though the communication signals are received at the predetermined first fault frequency FF1 from the downstream connection 550D, it is amplified and retransmitted through the upstream connection 550U at the first frequency F1. In a similar fashion, the second audio signal AS2 may be received by the upstream connection 550U and passed through switch 510B to the high band pass filter 432B and passed through switch 510C to the fault amplifier module 440F for amplification at the predetermined second fault frequency FF2. The second audio signal is then passed through the fault high band pass filter 433A, through the switch 510A and transmitted down the length L of the transmission line 12 at the predetermined second fault frequency FF2.

While the amplifier module 440 is illustrated as having two separate amplifier modules, namely the non-fault amplifier module 440N and the fault amplifier module 440F, it is understood that alternate configurations of the amplifier module 440 could also be used. For instance, it is possible that a single amplifier module 440 is used to amplify all signals either at the first and second frequencies F1, F2 or the first and second fault frequencies FF1, FF2.

It is understood that while the present invention has been described as communicating audio signals As, and video signals Vs, the present invention is not limited to such signals. Rather, the present invention can be used with a communication system which communicates any type of communication signals, whether audio signals As, video signals Vs, notification signals (not shown) and whether the communication signals are analog or digital.

It is also understood that the present invention will detect and facilitate overcoming any type of degradation 8, 8a, 8c occurring in the communication system 110 which would affect communication of communication signals, such as audio communication signals AS and video communication signals VS, as well as other types of communication signals. The degradation 8, 8a, 8c can occur from any type of event, such as fire, water, an explosion, or a short circuit in either radiating transmission line 12 or one of the components attached to the radiating communication line, such as the amplification unit 130 or branching unit 90 or another type of unit. Therefore, the communication system 110 will facilitate overcoming any type of degradation 8, 8a, 8c including faults arising in the transmission line 12, the one or more branching transmission lines 212 or a component of the communication system 110 such as an amplification unit 130 or a branching unit 90.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A radio frequency communication system for communicating signals, said system comprising:
   a radiating transmission line having a first end and a second end;
   a base station coupled to the first end, said base station comprising a base receiver for receiving a first communication signal at a first frequency from the first end;

at least two amplification units coupled to said transmission line at periodic locations for amplifying the first communication signal at the first frequency from previous amplification units in an upstream direction towards the first end, and said at least two amplification units having degradation detection units for detecting a degradation in the communication system between the at least two amplification units; and wherein upon detection of a degradation in the communication system between any two amplification units, the amplification units detecting the degradation change the frequency of the first communication signal along the radiating transmission line between the two amplification units having detected the degradation from the first frequency to a predetermined first fault frequency to facilitate overcoming the degradation in the communication system.

2. The radio frequency communication system as defined in claim 1 wherein the first fault frequency is different from any other frequency in the communication system between the two amplification units having detected the degradation.

3. The radio frequency communication system as defined in claim 1 wherein the first fault frequency is selected to facilitate radiation of the first communication signal from a first portion of the radiating transmission line located downstream of the degradation to a second portion of the radiating transmission line located upstream of the degradation.

4. The radio frequency communication system as defined in claim 1 wherein each amplification unit comprises:

a downstream connection for connecting a length of the transmission line in a downstream direction towards the second end of the transmission line, and, an upstream connection for connecting a length of the transmission line in the upstream direction towards the first end; and wherein, upon detection of a degradation in the length of the transmission line at the downstream connection, the amplification unit commences to receive the first communication signal at the predetermined first fault frequency and upon no detection of a degradation in the length of the transmission line at the upstream connection, the amplification unit transmits the first communication signal at the first frequency.

5. The radio frequency communication system as defined in claim 1 wherein each amplification unit comprises:

a downstream connection for connecting a length of the transmission line in a downstream direction towards the second end of the transmission line, and, an upstream connection for connecting a length of the transmission line in the upstream direction towards the first end; and wherein upon detection of a degradation in the length of the transmission line at the upstream connection, the amplification unit commences to transmit the first communication signal at the predetermined first fault frequency and increases a power level of the first communication signal to facilitate radiation of the first communication signal from a first portion of the radiating transmission line downstream of the degradation to be received by a second portion of the radiating transmission line upstream of the degradation.

6. The radio frequency communication system as defined in claim 1 wherein said base station comprises a base transmitter for transmitting a second communication signal at a second frequency into the first end;

wherein said at least two amplification units coupled to said transmission line at periodic locations amplify the second communication signal at the second frequency from previous amplification units in a downstream direction towards the second end of the transmission line;

wherein upon detection of a degradation in the communication system between any two amplification units, the amplification units detecting the degradation change the frequency of the second communication signal from the second frequency to a predetermined second fault frequency along the radiating transmission line between the two amplification units having detected the degradation to overcome the degradation in the communication system; and wherein the second fault frequency differs from any other frequency in the communication system.

7. The radio frequency communication system as defined in claim 6 wherein the first fault frequency is lower than the first frequency and the second fault frequency is lower than the second frequency.

8. The radio frequency communication system as defined in claim 6 wherein the second fault frequency is selected to facilitate radiation of the second communication signal from a first portion of the radiating transmission line located upstream of the degradation to a second portion of the radiating transmission line located downstream of the degradation.

9. The radio frequency communication system as defined in claim 6 wherein the degradation detection units detect a degradation in the communication system by detecting a decreased power level in either the first communication signal or the second communication signal for a predetermined time period.

10. The radio frequency communication system as defined in claim 1 wherein the degradation detection units detect a degradation in the communication system by detecting a decreased power level in the first communication signal for a predetermined time period.

11. The radio frequency communication system as defined in claim 1 wherein each amplification unit comprises:

a downstream degradation detection unit for detecting a degradation in the length of the transmission line at the downstream connection by detecting a decreased power level of a DC current received from the length of the transmission line connected in the downstream connection for a predetermined period of time; and wherein after the predetermined time period, the downstream degradation detection unit sends a switch signal to a fault switch causing the amplification unit to commence to receive the first communication signal at the predetermined first fault frequency.

12. The radio frequency communication signal as defined in claim 1 wherein the predetermined first fault frequency differs from any other frequency in the communication system; and wherein the degradation detection unit detects a degradation in the communication system by detecting transmission of any communication signal at the predetermined first fault frequency.

13. The radio frequency communication signal as defined in claim 1 further comprising:

a branching radiating transmission line having a first end, a second end and a branching unit for electrically coupling the first end of the branching radiating transmission line to the radiating transmission line, such that the first communication signals may pass to and from the branching radiating transmission line to the radiating transmission line either at the first frequency of the first fault frequency.

14. The radio frequency communication system as defined in claim 1 wherein a substantial part of the radiating transmission line is located below ground and the second end of the radiating transmission line is located remotely from the first end of the radiating transmission line.

15. The radio frequency communication system as defined in claim 14 wherein the base station is above ground and the communication system is used to facilitate communication in a mine.

16. In a radio frequency communication system for communicating communication signals on a radiating transmission line, said radiating transmission line having a first end and a second end located remotely from the first end, said first end coupled to a base station comprising a base receiver for receiving a first communication signal at a first frequency from the first end, an amplification unit for facilitating communication of the communication signals, said amplification unit comprising:
- a downstream connection for connecting a length of the transmission line in a downstream direction towards the second end of the transmission line;
- an upstream connection for connecting a length of the transmission line in an upstream direction towards the first end;
- an amplifier for amplifying the first communication signal in a direction towards the first end;
- a degradation detection unit for detecting a degradation in the communication signal in the length of the transmission line at the upstream connection;
- wherein upon detection of a degradation in the length of the transmission line in the upstream connection, the amplification unit commences to amplify and transmit the first communication signal at a predetermined first fault frequency and upon no detection of a degradation in the length of the transmission line at the downstream connection, the amplification unit continues to receive the first communication signal at the downstream connection at the first frequency.

17. The amplification unit as defined in claim 16 wherein the degradation detection unit detects degradations in the length of the transmission line at the downstream connection; and
wherein upon detection of a degradation in the downstream connection, the amplification unit commences to receive the first communication signal at the downstream connection at the predetermined first fault frequency.

18. The amplification unit as defined in claim 17 further comprising:
- a first downstream filter for filtering communication signals at the first frequency;
- a first downstream fault filter for filtering communication signals at the first fault frequency;
- a switch for switching the first communication signals to the first downstream filter or the first downstream fault filter; and
wherein upon the degradation unit detecting a degradation in the first communication signal in the length of the transmission at the downstream connection, the switch switches the first communication signal from the first downstream filter to the first downstream fault filter.

19. The amplification unit as defined in claim 16 wherein the first fault frequency is different from any other frequency in the communication system along the length of the transmission line over which the degradation has been detected.

20. The amplification unit as defined in claim 16 wherein the first fault frequency is selected to facilitate radiation of the first communication signal from a first portion of the radiating transmission line, located between the amplification unit and the location of the degradation, and, a second portion of the radiating transmission line, located between the degradation and another amplification unit in the communication system.

21. The amplification unit as defined in claims 16 further comprising:
- a first upstream filter for filtering communication signals at the first frequency;
- a first upstream fault filter for filtering communication signals at the first fault frequency;
- a switch for switching the first communication signals to the first upstream filter or the first upstream fault filter; and
  wherein upon detection of a degradation in the first communication signal in the length of the transmission line at the upstream connection, the switch switches the first communication signal after amplification at the first upstream fault frequency from the first upstream filter to the first upstream fault filter.

22. A method for communicating communication signals utilizing a radiating transmission line having at least two amplification units coupled to the transmission line at periodic locations for amplifying communication signals along the radiating transmission line, said method comprising:
- detecting a degradation in the communication signal along a link of the radiation transmission line between any two amplification units coupled to the radiating transmission line; and
- at each of the two amplification units detecting a degradation in the communication system, altering a frequency of the communication signal along the length of the transmission line between the two amplification units having detected the degradation from a first frequency, used when no degradation is detected, to a predetermined first fault frequency different from the first frequency.

23. The method as defined in claim 22 wherein the first fault frequency is selected to facilitate radiation of the communication signals from a first portion of the length of the transmission line downstream of the degradation to a second portion of the length of the transmission line upstream of the degradation unit.

* * * * *